(12) United States Patent
Douglis et al.

(10) Patent No.: US 8,639,669 B1
(45) Date of Patent: Jan. 28, 2014

(54) METHOD AND APPARATUS FOR DETERMINING OPTIMAL CHUNK SIZES OF A DEDUPLICATED STORAGE SYSTEM

(75) Inventors: Frederick Douglis, Basking Ridge, NJ (US); Philip N. Shilane, Yardley, PA (US); Grant Wallace, Pennington, NJ (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/334,732

(22) Filed: Dec. 22, 2011

(51) Int. Cl.
  *G06F 7/00* (2006.01)
  *G06F 17/00* (2006.01)

(52) U.S. Cl.
  USPC .......................................... 707/692

(58) Field of Classification Search
  USPC ......................... 707/692, 747, 812
  See application file for complete search history.

(56) References Cited

U.S. PATENT DOCUMENTS

| | | | |
|---|---|---|---|
| 5,778,395 A | 7/1998 | Whiting et al. | |
| 7,146,465 B2 | 12/2006 | Korgaonkar | |
| 7,539,710 B1 * | 5/2009 | Haustein et al. | 1/1 |
| 7,979,491 B2 * | 7/2011 | Lillibridge et al. | 709/205 |
| 7,996,371 B1 | 8/2011 | Deshmukh | |
| 8,065,433 B2 | 11/2011 | Guo et al. | |
| 8,095,756 B1 * | 1/2012 | Somavarapu et al. | 711/162 |
| 8,140,491 B2 * | 3/2012 | Mandagere et al. | 707/692 |
| 8,346,736 B2 * | 1/2013 | Haustein et al. | 707/692 |
| 2005/0163014 A1 * | 7/2005 | Soeda | 369/84 |
| 2006/0101204 A1 | 5/2006 | Bao | |
| 2006/0155931 A1 | 7/2006 | Birrell et al. | |
| 2006/0161810 A1 | 7/2006 | Bao | |
| 2006/0167922 A1 | 7/2006 | Poyourow | |
| 2009/0182789 A1 * | 7/2009 | Sandorfi et al. | 707/204 |
| 2009/0254609 A1 * | 10/2009 | Wideman | 709/203 |
| 2009/0271454 A1 | 10/2009 | Anglin et al. | |
| 2009/0300321 A1 | 12/2009 | Balachandran et al. | |
| 2010/0235485 A1 | 9/2010 | Lillibridge | |
| 2011/0040951 A1 * | 2/2011 | Akirav et al. | 712/4 |
| 2011/0099204 A1 * | 4/2011 | Thaler | 707/797 |
| 2011/0196900 A1 * | 8/2011 | Drobychev et al. | 707/812 |
| 2012/0030477 A1 * | 2/2012 | Lu et al. | 713/189 |
| 2012/0131025 A1 * | 5/2012 | Cheung et al. | 707/755 |
| 2012/0159098 A1 * | 6/2012 | Cheung et al. | 711/162 |
| 2012/0166448 A1 * | 6/2012 | Li et al. | 707/747 |
| 2013/0046733 A1 * | 2/2013 | Sakuraba et al. | 707/640 |

OTHER PUBLICATIONS

Liu, Chuanyi, et al., "ADMAD: Application-Driven Metadata Aware De-duplication Archival Storage System", Fifth IEEE International Workshop on Storage Network Architecture and Parallel I/Os, 2008, pp. 29-35, IEEE.
Liu, Chuanyi, et al., "R-ADMAD: High Reliability Provision for Large-Scale De-duplication Archival Storage Systems," Jun. 8-12, 2009, pp. 370-379, ICS'09, Yorktown Heights, New York, USA.
Min, Jaehong, et al., "Efficient Deduplication Techniques for Modern Backup Operation," Jun. 2011, pp. 824-841, IEEE Transactions on Computers, vol. 60, No. 6.

* cited by examiner

*Primary Examiner* — Robert Beausoliel, Jr.
*Assistant Examiner* — Nicholas Allen
(74) *Attorney, Agent, or Firm* — Blakely Sokoloff Taylor & Zafman LLP

(57) ABSTRACT

Techniques for evaluating deduplication effectiveness of data chunks in a storage system are described herein. In one embodiment, metadata of first data chunks associated with a deduplicated storage system is examined, where the first data chunks have been partitioned according to a first chunk size. A second chunk size is calculated based on the examination of the metadata of first data chunks. Metadata of the first data chunks is merged according to the second chunk size to represent second data chunks to which the first data chunks would have been merged. A deduplication rate of the second data chunks is determined based on the merged metadata.

24 Claims, 14 Drawing Sheets

801
8KB average native

| Fingerprint | Length |
|---|---|
| SHA(A) | 8052 |
| SHA(B) | 5678 |
| SHA(C) | 9123 |
| SHA(D) | 10201 |
| SHA(B) | 5678 |
| SHA(E) | 6789 |
| SHA(F) | 8888 |
| SHA(G) | 7532 |

802
32KB average native

| Fingerprint | Length |
|---|---|
| SHA(ABCD) | 8052+5678+9123+10201 |
| SHA(BEFG) | 5678+6789+8888+7532 |

FIG. 8A

| Fingerprint | Length |
|---|---|
| SHA(A) | 8052 |
| SHA(AB) | 8052+5678 |
| SHA(ABC) | 8052+5678+9123 |
| SHA(ABCD) | 8052+5678+9123+10201 |
| SHA(ABCDB) | 8052+5678+9123+10201+5678 |
| SHA(ABCDBE) | 8052+5678+9123+10201+5678+6789 |

FIG. 8B

METHOD AND APPARATUS FOR DETERMINING OPTIMAL CHUNK SIZES OF A DEDUPLICATED STORAGE SYSTEM

RELATED APPLICATIONS

This application is related to U.S. patent application Ser. No. 13/334,723, entitled "System and Method for Content-Aware Resizing of Data Chunks for Replication," filed Dec. 22, 2011.

FIELD OF THE INVENTION

Embodiments of the present invention relate generally to data storage systems. More particularly, embodiments of the invention relate to determining optimal chunk sizes of a deduplicated storage system.

BACKGROUND

In a deduplicating storage system, content is typically divided into variable-sized "chunks" based on characteristics of the data. If a hash of a chunk, also known as a fingerprint, matches that of a chunk already stored in the system, the chunk is known to be a duplicate. The goal of using variable-sized chunks is to isolate changes so that a modification that shifts data up or down in a file will not cause all subsequent pieces of the file to be different from the earlier version. Chunks have a target average size, such as 8 KB, with minimum and maximum sizes constraining the size of any specific chunk.

By using different sized chunks, a system can trade off deduplication effectiveness against overhead cost. When there are long regions of unchanged data, a smaller chunk size has little effect, since any chunk size will deduplicate equally well. Similarly, when there are frequent changes, spaced closer together than a chunk, all chunks will be different and fail to deduplicate. But when the changes are sporadic relative to a given chunk size, having smaller chunks can help to isolate the parts that have changed from the parts that have not, and the overall compression achieved from deduplication is improved.

At the same time, since every chunk requires certain metadata to track its location, and the mapping of files to chunks must enumerate more chunks if the chunks are smaller, the per-chunk overhead scales inversely with the chunk size. More data must be stored, and more chunks must be looked up in the system; i.e., there is additional storage overhead and computational overhead as a result of smaller chunks. There has been a lack of efficient mechanism to determine a chunk size that provides the best balance between deduplication effectiveness and overhead. Further, when replicating data from a source storage system to a target storage system having different chunk sizes, data chunks are typically replicated without considering the average chunk size of the target storage system. Such a replication may have an impact on the performance of the target storage system.

BRIEF DESCRIPTION OF THE DRAWINGS

Embodiments of the invention are illustrated by way of example and not limitation in the figures of the accompanying drawings in which like references indicate similar elements.

FIGS. 8A and 8B are examples of data structures which may be used with embodiments of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism is provided to resize content-defined chunks in a deduplicated storage system in view of a given chunk size. Chunk resizing can be used to support replication across heterogeneous deduplication systems, as well as to estimate the deduplication that would be achieved by changing or resizing the unit of deduplication. Chunks can be resized at a logical stream level, similar to how content-defined chunks are formed, and producing resized chunks with similar size and deduplication characteristics as would be seen if the chunks were formed from the logical stream at a different size. They can also be resized (e.g., merged) from sub-chunks, which are pieces of the original content defined chunks. In this case, they can be formed at the logical stream level (e.g., a file level), similar to the approach above, or at the physical storage level, in which resized chunks do not span boundaries of the original chunks from which the sub-chunks were derived. At the physical level, according to one embodiment, resized chunks can be created using content information (such as fingerprints) or size information. Such techniques can be used for replication amongst deduplicated storage systems with different chunk sizes. Such systems may have different chunk sizes because of the desire to optimize deduplication rates and/or throughput requirements.

Figure 1:
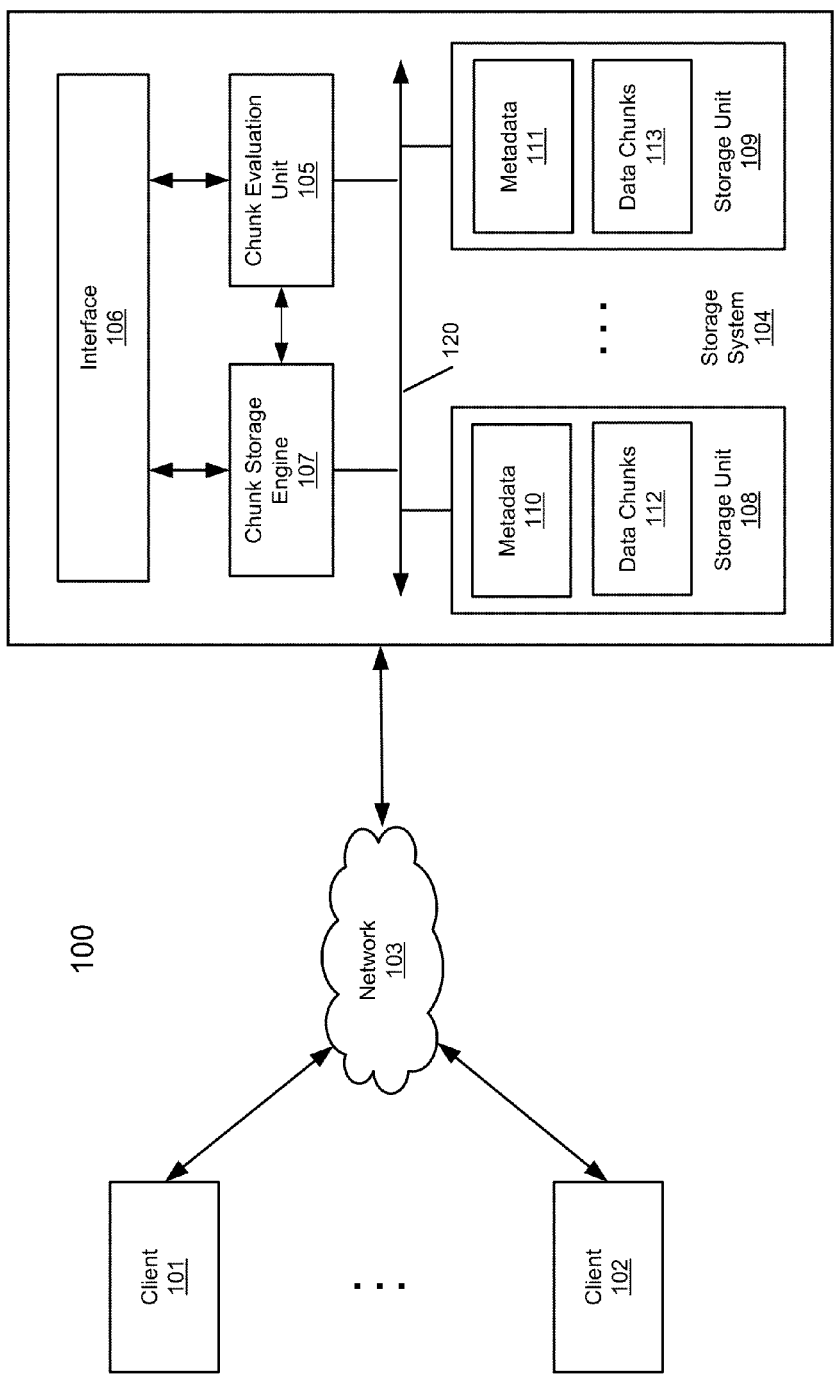
FIG. 1 is a block diagram illustrating a storage system according to one embodiment of the invention.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an backup and/or archive system such as a de-duplication storage system available from EMC® Corporation of Hopkinton, Mass.

In one embodiment, storage system 104 includes, but is not limited to, interface 106, chunk storage engine 107, and one or more storage units 108-109 communicatively. Storage units 108-109 may be implemented locally (e.g., single node operating environment) or remotely (e.g., multi-node operating environment) via interconnect 120, which may be a bus or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. The storage units 108-109 may be organized into one or more volumes of Redundant Array of Inexpensive Disks (RAID).

In response to a data file to be stored in storage units 108-109, chunk storage engine 107 is configured to chunk or partition the data file into multiple chunks according to a variety of policies or rules. Chunk storage engine 107 may identify when a data chunk has been previously stored in the storage unit and then avoid storing a duplicate copy of the data chunk. Instead it replaces the data chunk with a reference to the previously stored copy in the storage unit. In the event that a chunk has been previously stored, metadata stores information enabling the reconstruction of a file using the previously stored chunk. As a result, chunks of data files are stored in a deduplicated manner, either within each of storage units 108-109 or across at least some of storage units 108-109. In addition, metadata is added to at least some of storage units 108-109, such that files can be accessed independent of another storage unit. Data stored in the storage units may be stored in a compressed form (e.g., lossless compression: Huffman coding, Lempel-Ziv Welch coding; delta encoding: a reference to a chunk plus a difference; subchunking: a list of subchunks or references to subchunks, etc.). In one embodiment, different storage units may use different compressions (e.g., main or active storage unit from other storage units, one storage unit from another storage unit, etc.).

Metadata of each storage unit includes enough information to provide access to the files it contains. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the metadata stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units).

In one embodiment, storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to this invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, in one embodiment, when data chunks of files such as data chunks 112-113 are stored in storage units 108-109, respectively, metadata associated with the data chunks are computed and stored in the storage units such as metadata 110-111. Note that metadata 110-111 may also be stored in a separate storage location (e.g., globally with respect to storage units 108-109) accessible by chunk storage engine 107, instead of being stored in individual ones of storage units 108-109. The metadata may include a fingerprint of a data chunk or other information such as a feature extracted from a data chunk. In one embodiment, a fingerprint may include a hash value computed based on the data chunk using a variety of hash algorithms, such as SHA-1 or MD5 hash algorithms. Note that the terms of "a segment" and "a data chunk" or "a chunk" are interchangeable terms throughout this application. A data chunk or a chunk is also referred to as a segment, or vice versa. Similarly, a segment storage engine may also be referred to as a chunk storage engine, or vice versa.

According to one embodiment, storage system 104 includes chunk evaluation unit 105 communicatively coupled to interface 106 and chunk storage engine 107. Chunk evaluation unit 105 is configured to evaluate chunk sizes of data chunks stored in storage units 108-109. The analysis result of the evaluation can be used to resize (e.g., upsize or downsize) data chunks from a first average chunk size to a second average chunk size. For example, for given average chunk size that is used by a target storage system, chunk evaluation unit 105 associated with a source storage unit may determine boundaries of the new or resized data chunks that have an average chunk size similar to or within a predetermined proximity of the average chunk size of the target storage.

In response to a request to replicate or migrate data chunks from a first storage system (e.g., source storage system) having a first average chunk size to a second storage system (e.g., a target storage system) having a second average chunk size, chunk evaluation unit 105 is configured to evaluate the data chunks stored in the first storage system and to determine boundaries or chunk sizes of resized chunks. Such an evaluation may be performed on metadata (e.g., fingerprints) of the data chunks without using the actual content of the data chunks. The data chunks are then resized and the resized chunks are replicated or migrated to the second storage system. As a result, all data chunks stored in the second storage system have similar chunk sizes for efficient storage and/or performance, even though the first and second storage systems have different average chunk sizes.

According to one embodiment, chunk evaluation unit 105 is configured to analyze metadata of data chunks stored in a storage system to determine an average chunk size that is most appropriate for the storage system. For example, chunk evaluation unit 105 is configured to determine a new average chunk size that when the data chunks are chunked according to the new average chunk size, the storage system would have a better deduplication rate or better performance in view of the overhead cost to maintain such data chunks. Such techniques can be implemented as a part of evaluation tool to allow a field engineer to evaluate or diagnose a particular storage system of a customer and to come up with a new average chunk size optimizes for deduplication, throughput, and overhead costs.

In one embodiment, chunk evaluation unit 105 can evaluate the data chunks at a logical stream level (e.g., a file level with duplicated data chunks) and/or at a physical data chunk level (e.g., deduplicated data chunks). Note that data replication or migration can be performed from a source storage system having a smaller average chunk size to a target storage system having a larger average chunk size, or vice versa. The term of "resize" used throughout this application applies to merging smaller data chunks into a large data chunks, as well as dividing a large data chunk into smaller data chunks.

Note that throughout this application, a deduplicated storage system is utilized as an example of a data storage system. However, the techniques described throughout this application can also be applied to other types of non-duplicated storage system. Also note that a fingerprint is utilized as an example of representative data, however, other types of data such as a feature, signature, or pattern of data can also be applied.

Figure 2:
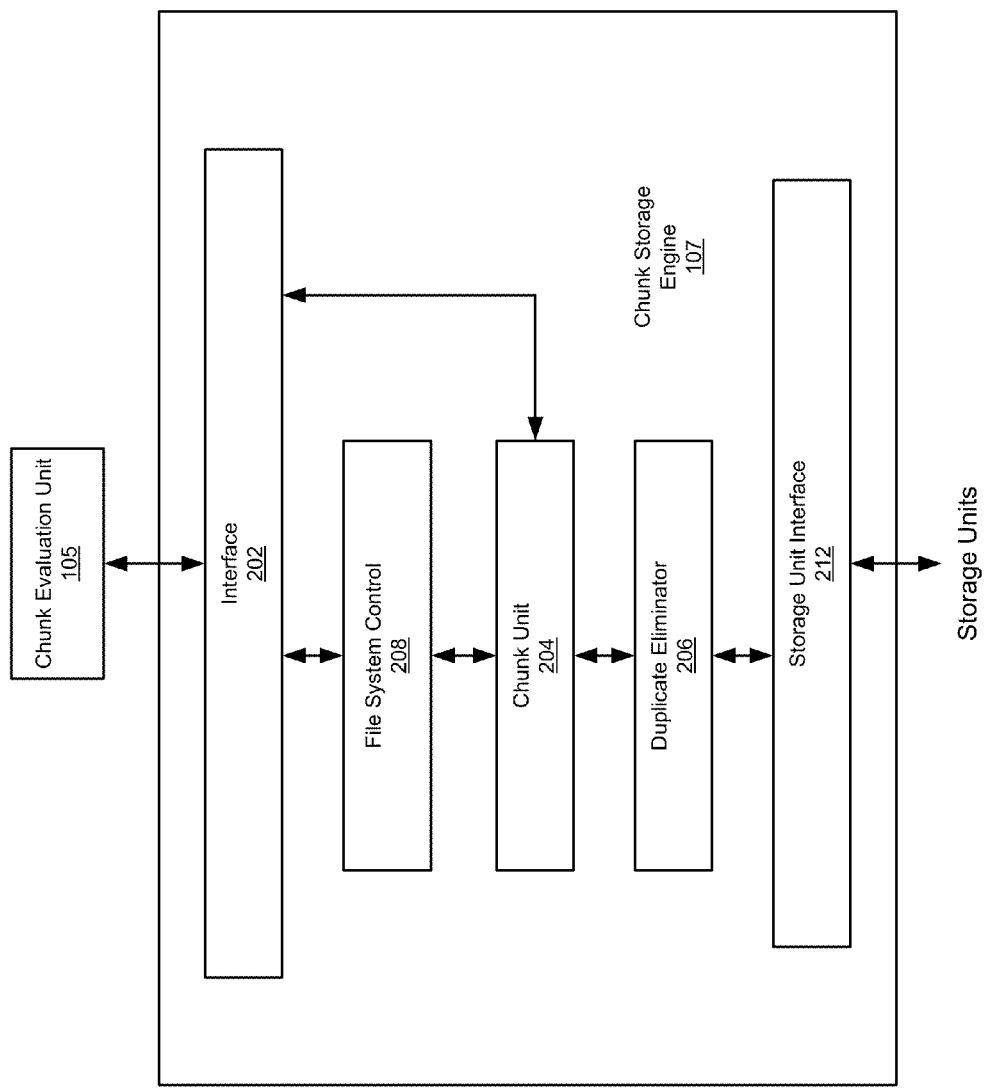
FIG. 2 is a block diagram illustrating a chunk storage engine according to one embodiment of the invention.

FIG. 2 is a block diagram illustrating a chunk storage engine according to one embodiment of the invention. Note that for purposes of illustration only, certain reference numbers for certain components having the same or similar functionalities from the previous figures or description may be retained the same. Referring to FIG. 2, in one embodiment, chunk storage engine 107 includes interface 202, chunk unit 204, duplicate eliminator 206, file system control 208, and storage unit interface 212. Chunk storage engine 107 receives data item(s) (e.g., files) via interface 202. The data item(s) or file(s) is/are processed by chunk unit 204 and file system control 208. Chunk unit 204 partitions the data item(s) into segments or chunks based on a variety of rules or considerations. For example, the data item(s) may be broken into chunks by identifying chunk boundaries using a content-based technique (e.g., a function is calculated at various locations of a data item, when the function is equal to a value or when the value is a minimum, a maximum, or other value relative to other function values calculated for the data item), a non-content-based technique (e.g., based on data item property for example, byte length, title, creation date), or any other appropriate technique. In one embodiment, a chunk is restricted to a minimum and/or maximum length, to a minimum or maximum number of chunks per data item, or any other appropriate limitation.

In one embodiment, file system control 208 processes information to indicate the chunk(s) association with a data item. In some embodiments, a list of fingerprints is used to indicate chunk(s) associated with a data item. File system control 208 passes chunk association information to an index (not shown). The index is used to locate stored chunks in storage unit(s) via storage unit interface 212. Duplicate eliminator 206 identifies whether a newly received chunk has already been stored in storage unit(s). In the event that a chunk has already been stored in storage unit(s), a reference to the previously stored chunk is stored instead of storing the newly received chunk.

Interface 202 is configured to receive a request to retrieve a data item. Interface 202 communicates with file system control 208 to identify appropriate chunks stored in storage units via storage unit interface 212. File system control 208 communicates with an index (not shown) to locate appropriate chunks stored in storage units via storage unit interface 212. Appropriate chunks are used to construct the requested data item. The data item is provided via interface 202 in response to the request. In one embodiment, file system control 208 utilizes a tree of content-based identifiers (e.g., fingerprints) to associate a file with data chunks and their locations in storage unit(s).

According to one embodiment, interface 202 allows chunk evaluation unit 105 to analyze metadata (e.g., fingerprints) of data chunks stored in a storage unit. In one embodiment, chunk evaluation unit 105 is configured to analyze fingerprints of the data chunks without accessing the actual content of the data chunks to determine a new average chunk size that is most appropriate for the store system. The new average chunk size may be determined based on values of the fingerprints of the data chunks at a logical stream level or at a physical chunk level. The new average chunk size may be used to replicate or migrate data chunks to a target storage system that has an average chunk size similar to the new average chunk size. The new average chunk size may be used to rechunk or repartition the data chunks such that the deduplication rate of the data chunks is improved while maintaining a relatively low overhead cost.

According to some embodiments, a chunk size plays two roles, in terms of (a) replicating data between two deduplicating storage servers that may use different chunk sizes and (b) deciding on the best chunk size for a workload. The first application of chunk resizing is to support replication between systems of different chunk sizes. For example, if a system with 8 KB chunks is replicated to a system with 16 KB chunks, the content has to be transformed to match the native data of 16 KB. If the receiving system chunks data natively at a larger size, merged chunks will typically not match existing content from the receiving system. However, merged chunks will match other merged chunks from the same (sending) system as well as merged chunks from other systems that use the same merging process to replicate onto the same system. In addition, merged chunks using the original anchors that were used to chunk the content in the first place may align with chunks that were formed at a larger size.

The techniques of chunk resizing can be used to replicate onto systems with larger chunk sizes or smaller chunk sizes. In the case of larger chunks, the source or sending system merges chunks prior to replication. In the case of smaller chunks, the source system can create smaller chunks, then merge them locally and store the larger chunks, as well as the offsets within the chunks that correspond to the smaller component chunks (e.g., metadata representing the smaller chunks within a merged chunk). When replicating, according to one embodiment, the source system is to partition the merged chunks back into their component chunks using the metadata and to transmit the smaller chunks to the target or receiving system.

Figure 3:
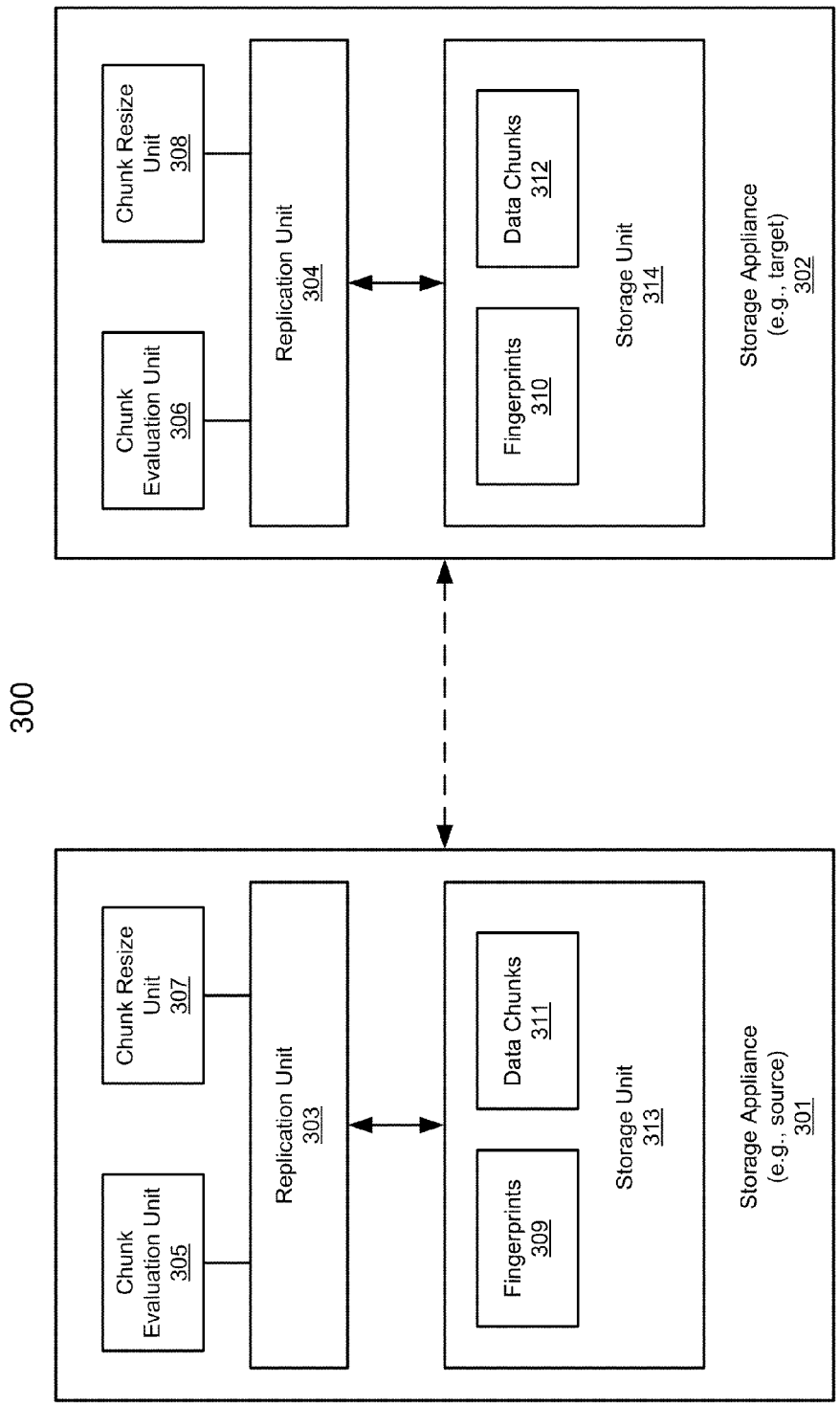
FIG. 3 is a block diagram illustrating a deduplicated storage system according to one embodiment of the invention.

FIG. 3 is a block diagram illustrating a deduplicated storage system according to one embodiment of the invention. System 300 may be implemented as part of system 100 of FIG. 1. Referring to FIG. 3, storage appliances 301-302 are communicatively coupled to each other. Each of storage appliances 301-302 includes a storage unit (e.g., storage units 313-314) to store deduplicated data chunks (e.g., data chunks 311-312) and their associated metadata such as fingerprints (e.g., fingerprints 309-310). Any of storage appliances 301-302 can be a source storage appliance or a target storage appliance for the purpose of replication or migration.

In one embodiment, each of the storage appliances 301-302 is associated with a replication unit (e.g., replication units 303-304), a chunk evaluation unit (e.g., chunk evaluation units 305-306), and a chunk resize unit (e.g., resize units 307-308). Note that the replication unit, chunk evaluation unit, and resize unit may be implemented within each of storage appliances 301-302. Alternatively, they may be implemented as part of a management entity or server shared by storage appliances 301-302. The replication unit, chunk evaluation unit, and resize unit may also be implemented as a single unit or module.

For the purpose of illustration, it is assumed that storage appliance 301 is a source storage system while storage appliance 302 is a target storage system for the purpose of replication or data migration. It is further assumed that storage appliance 301 has a first average chunk size that is different than a second average chunk size of storage appliance 302. In one embodiment, in response to a request for replicating data chunks 311 from storage appliance 301 to storage appliance 302, chunk evaluation unit 305 is configured to analyze fingerprints 309 associated with data chunks 311 to determine boundaries of resized chunks in view of the second average chunk size of target storage appliance 302. In one embodiment, chunk evaluation unit 305 is configured to determine the boundaries of the resize chunks based on fingerprints 309 without accessing content of the data chunks 311. The boundaries of the resized chunks may be determined based on fingerprint values of data chunks. Alternatively, the boundaries of the resized chunks may be determined by other information such as features of the data chunks. In one embodiment, a boundary of a resized chunk is determined based on the highest (or above a predetermined threshold) or lowest (or below a predetermined threshold) fingerprint value amongst fingerprint values within a predetermined proximity, such that a chunk size of the resized chunk falls within a predetermined range (e.g., minimum allowance and maximum allowance) of the second average chunk size. Once the boundaries of the resized chunks are determined, resize unit 307 is configured to resize data chunks 311 into resized chunks according to the determined boundaries and replication unit 303 is configured to replicate the resized chunks to storage appliance 302 accordingly.

According to one embodiment, one way to compute chunks of varying sizes is to take a stream of data, and simultaneously chunk it at multiple granularities (e.g., different chunk sizes). The data associated with each chunk (fingerprint, size, and contents) would be stored, and fingerprints could be compared to determine the amount of duplication. For the purpose of finding duplicates, the fingerprint suffices and the contents of the chunk need not be considered. Thus the system would have a set of fingerprints and chunk sizes for each of a number of average chunk sizes, such as 8 KB, 16 KB, ... 64 KB, etc. The fingerprints of data chunks within a given collection, such as 16 KB, could be compared against each other to determine the set of unique chunks. Totaling the sizes of all chunks compared to the sizes of the unique chunks represents a deduplication ratio. The overhead is a simple function of the number of chunks.

An embodiment of the invention permits a similar analysis of the effect of chunk size without requiring the raw data to be chunked at different sizes a priori. Instead of reading the "logical" (i.e. pre-deduplication) stream of data being deduplicated, one can collect just the fingerprints and sizes of the native deduplicated chunks, for instance at 8 KB. To estimate the deduplication of the data at larger average chunk sizes, according to one embodiment, one can synthesize "merged chunks," henceforth referred to as mchunks, using just the fingerprints and sizes of the original chunks.

According to one embodiment, one approach to merging data chunks would be to combine a fixed number of chunks. For instance, to target mchunks that average 64 KB, one could combine 8 chunks that are targeted to average 8 KB. However, even if the overall average across millions of chunks is 8 KB, any individual chunk can span a wide range between the minimum and maximum chunk sizes (e.g., 4 KB to 12 KB). If all eight chunks are close to one end of this range or the other, the size of the mchunk will be at the extreme end of the range as well. In addition, using a fixed number of chunks suffers from the same problem as fixed-size chunks, in that a small change can propagate throughout the data. For example, a single 8 KB insertion in a 1 GB file, with all later chunks unchanged would cause each mchunk to differ from the previous version in its first chunk.)

Thus, it is useful to merge chunks in a content-defined fashion, similar to content-defined chunking. In one embodiment, the values of the fingerprints of the chunks themselves are utilized to accomplish this. As stated above, for a given average chunk size (e.g., target average chunk size), the system enforces both minimum and maximum sizes. To create an mchunk within those constraints, according to one embodiment, a minimum number of chunks are grouped to reach the minimum size, then processing logic is to select how many additional chunks to include in the mchunk in a content-aware fashion. For instance, to merge 8 KB chunks into 32 KB mchunks (16 KB minimum and 48 KB maximum), processing logic would start with enough 8 KB-average chunks to create at least a 16 KB mchunk to satisfy the minimum chunk size requirement of a target average chunk size, then look at the fingerprints of the next N chunks, where the Nth chunk considered is the last chunk that, if included in the mchunk, would not exceed the maximum chunk size (i.e., 48 KB) of the target average chunk size.

At this point, there is a choice among a few possible chunks at which to separate the current mchunk from the next one. There is a need of a content-defined method to select which chunk to use as the breakpoint, similar to the method used for forming chunks in the first place within a size range. According to one embodiment, a chunk with the highest or lowest fingerprint value is selected as a breakpoint or boundary for the corresponding mchunk. Since fingerprints are uniformly distributed, and the same data will produce the same fingerprint, this technique produces consistent results (with sizes and deduplication comparable to chunking the original data. To evaluate the deduplication achieved from these mchunks, a fingerprint is created to represent an mchunk that is a hash such as SHA-1 hash of the concatenation of the fingerprints of the individual chunks. Thus a later mchunk will only match this mchunk if it is comprised of the same set of chunks. The size of the mchunk is the sum of the sizes of its comprising chunks.

In this embodiment, native chunks, such as 8 KB chunks, are merged into larger chunks such as 16 KB chunks. One way to do this is to look at the sequence of chunks in the order of the original data stream, i.e. pre-deduplication. We cannot merge arbitrary chunks; we have to merge chunks that are adjacent in the files that were chunked in the first place (otherwise, the ordering of chunks is arbitrary and will not match up to other merged chunks elsewhere). An additional possibility is to break the 8 KB chunks into smaller chunks (e.g., 1 KB, 2 KB, or 4 KB chunks). Similar to the discussion about merging chunks, according to one embodiment, one option would be to compute all possible chunk sizes at once, then compute the deduplication obtained. But one can use the merging technique to save the smaller chunks ("sub-chunks") at the smallest granularity desired, such as 1 KB, and then merge sub-chunks back into larger mchunks such as 2 KB or 4 KB, etc.

In the case of sub-chunks of original chunks, according to some embodiments, there are two variants. One uses the same algorithm as described above for native chunks. In one embodiment, looking at the full ordered sequence of sub-chunks, one could create mchunks without regard to the original chunk boundaries that contain the sub-chunks. In another embodiment, one approach is to respect the boundaries of the physical chunks (e.g., original chunks). This distinction could be useful in some applications, such as replicating to another deduplicating system that uses a different chunk size. If merging sub-chunks at the physical level, there are only a few sub-chunks to consider at a time. For instance, if the sub-chunk average is 1 KB with a minimum of 512B, and the chunk average is 8 KB with a maximum of 12 KB, there can be at most 24 sub-chunks in a chunk (and as few as 2, if there are two maximal 2 KB sub-chunks created from one minimal 4 KB chunk). Given the small number of chunks to deal with, there is a likelihood of creating one or more average-sized mchunks followed by a small mchunk.

Figure 4:
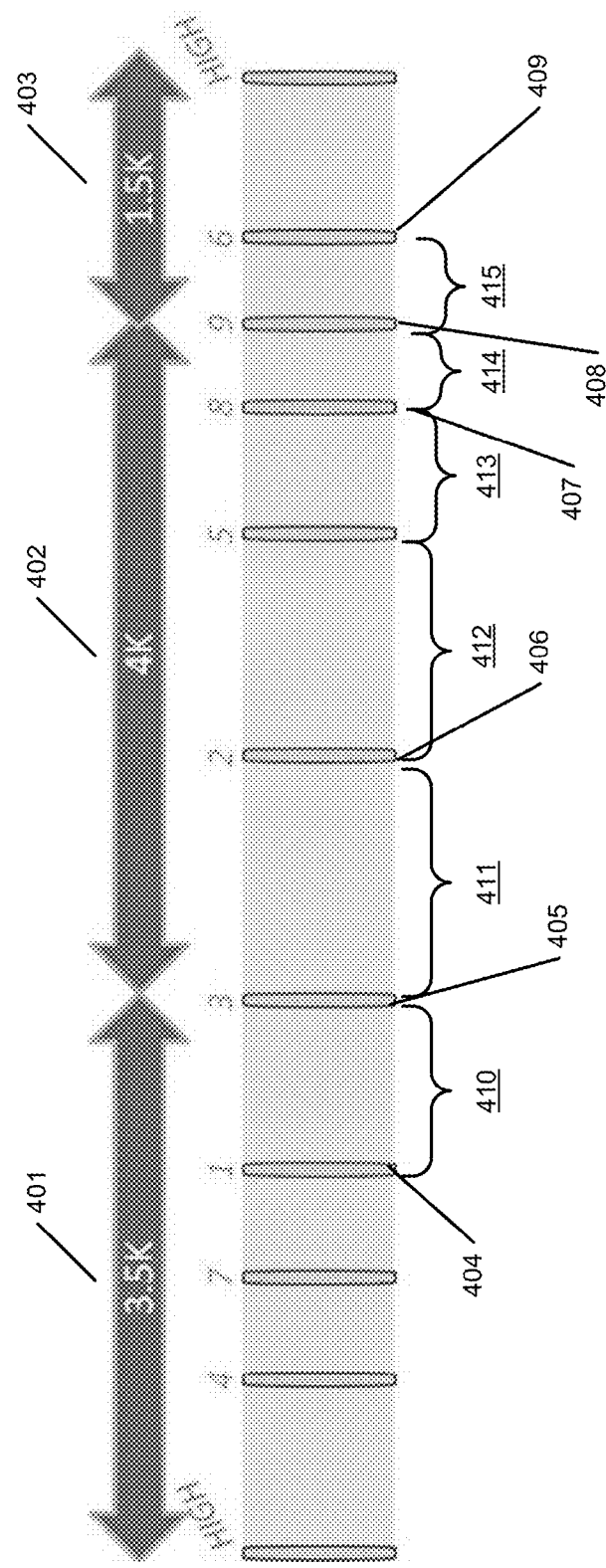
FIG. 4 is a diagram illustrating a process to determine boundaries of resized chunks according to one embodiment of the invention.

FIG. 4 is a diagram illustrating a process to determine boundaries of merged chunks according to one embodiment of the invention. Referring to FIG. 4, for the purpose of illustrating, the numbers (e.g., 1, 2, 3, . . . , 9) represent the relative values of the fingerprints of the chunks, i.e. the third fingerprint from the right (e.g., fingerprint 408) has a high value compared to the neighboring fingerprints 407 and 409. Note that in this example, fingerprints 404-409 represent data chunks 410-415, respectively. Thus, the fingerprint of chunk 408 is utilized as a breakpoint or boundary for merged chunk 402. However, on the left side the chunks with fingerprint values 4 and 7 are ignored because more chunks are needed to meet the minimum size of the target average chunk size (e.g., 2 KB) in order to form merged chunk 401. Among the options (e.g., chunks 404-406 with fingerprint values of 1, 3, and 2, respectively), the middle fingerprint (e.g., chunk 405) is selected because it is the highest compared to fingerprints of the neighboring chunks (e.g., chunks 404 and 406). That separates the 3.5 KB mchunk 401 from the 4 KB mchunk 402 that follows, and both chunk sizes fall within the range of the target average chunk size.

Thus, in this embodiment, the processing logic (e.g., chunk evaluation unit 105 of FIG. 1) is configured to "walk" through the fingerprints in sequence or order to find an appropriate breakpoint or boundary that satisfies the target average chunk size (e.g., within the minimum and maximum chunk sizes of the target average chunk size). Such an analysis is performed for each of the merged chunks based on values of the fingerprints without using content of the actual data chunks. In one embodiment, such a fingerprint analysis is performed at a logical level, such as a file represented by a sequence of data chunks. Since the boundaries of the merged chunks are determined based on fingerprint values of the neighboring data chunks in the sequence, the merged chunks are formed based on the content of the data chunks from a file point of view (e.g., content aware manner).

Figure 5:
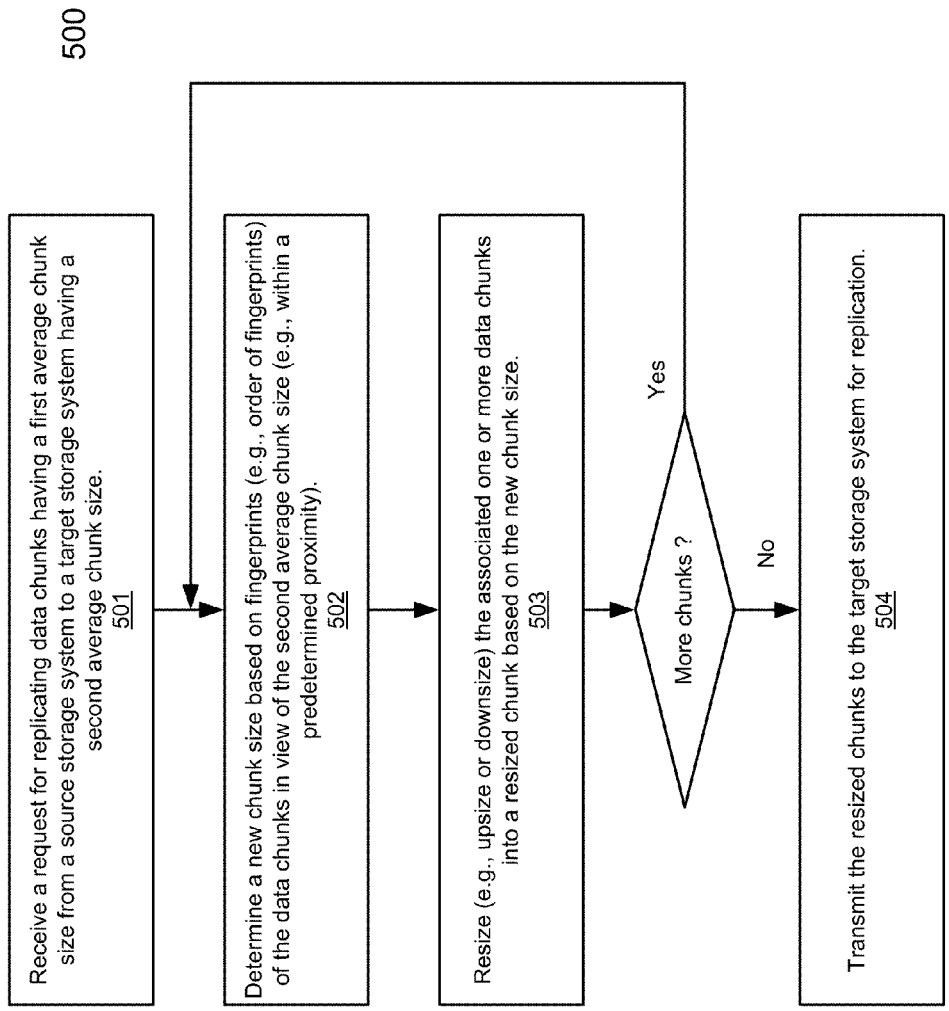
FIG. 5 is a flow diagram illustrating a method for replicating data chunks of a storage system according to one embodiment of the invention.

FIG. 5 is a flow diagram illustrating a method for replicating data chunks of a storage system according to one embodiment of the invention. Method 500 may be performed by system 104 of FIG. 1. Referring to FIG. 5, at block 501, a request is received for replicating or migrating data chunks of a source storage system having a first average chunk size to a target storage system having a second average chunk size. At block 502, processing logic determines a new chunk size or boundary of a resized chunk based on fingerprints of data chunks of the source storage system in view of the second average chunk size of the target storage system. In one embodiment, the new chunk size is within a predetermined proximity of the second average chunk size (e.g., within a minimum and maximum chunk sizes of the second average chunk size). At block 503, the associated data chunks are resized to form a resized chunk. The above process is iteratively performed for all remaining data chunks to be replicated or migrated. At block 504, the resized chunks are then transmitted to the target storage system to be stored therein for replication.

The above described techniques for determining resized chunks sizes based on the order of the fingerprints sometimes can lead to a resized chunk at the end of the sequence that may not satisfy the target average chunk size. Referring back to FIG. 4, in this example, resized chunk 403 at the end may be below the minimum allowed chunk size (i.e., less than the minimum of 2 KB). In addition to determining merged chunk sizes based on fingerprint values, according to another embodiment, the merged chunk sizes may also be determined based on sizes of the data chunks that form the merged chunks. In one embodiment, to avoid having a "dangling" small mchunk at the end of each original chunk, an alternative content-defined approach is to use the size of the sub-chunks rather than their fingerprints. Mchunks are formed by taking sub-chunks as close to the target size as possible, then recursing on the rest of the original chunk to see if it too can be resized into appropriate sizes. If there is a dangling small mchunk, the processing logic is to backtrack and adjust to get more appropriate sizes of the merged chunks.

Figure 6A:
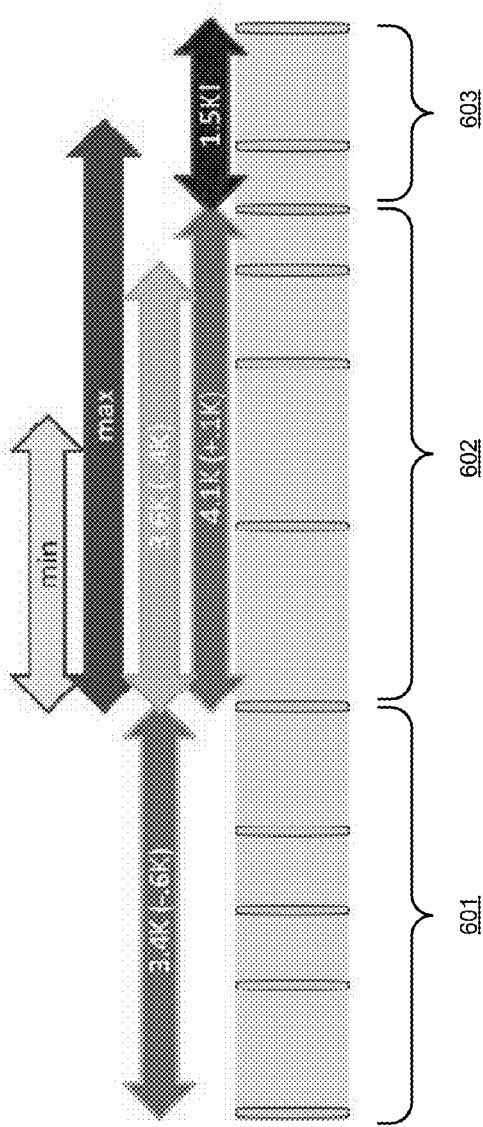
FIGS. 6A and 6B are diagrams illustrating a process to determine boundaries of resized chunks according to another embodiment of the invention.
Figure 6B:
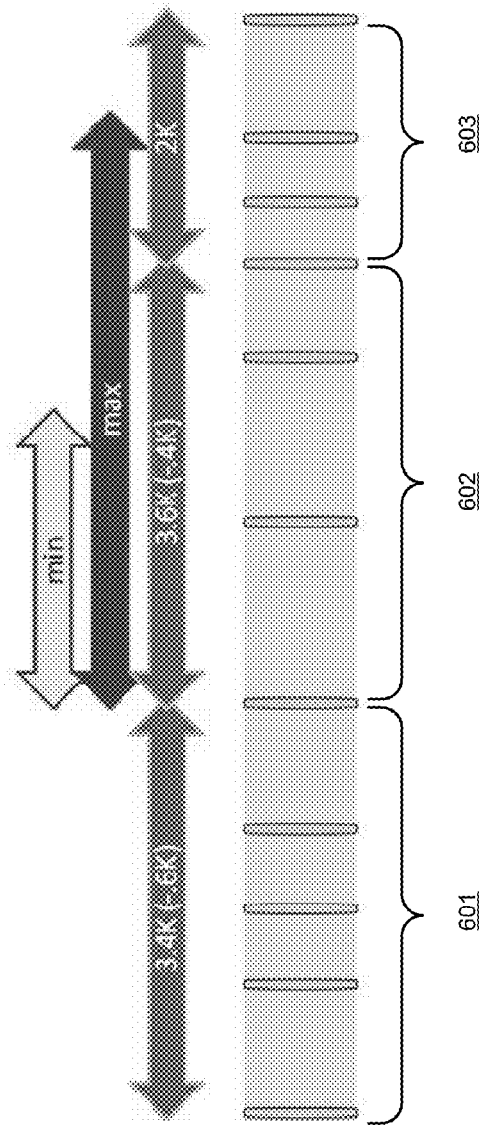

FIGS. 6A and 6B are diagrams illustrating a process to determine merged chunk sizes according to another embodiment of the invention. Referring to FIGS. 6A and 6B, the processing logic is to scan the fingerprints of the data chunks and also consider the sizes of the data chunks to ensure that the merged chunk sizes satisfy the target average chunk size. In this example, referring to FIG. 6A, merged chunks 601-603 may be formed using the techniques described above. Here as shown in FIG. 6A, the chunk size of merged chunk 603 does not satisfy the target average chunk size because it falls below the minimum chunk size of 2 KB. According to one embodiment, once this is detected, the processing logic backtracks to adjust chunk sizes of some other merged chunks to make room for the unqualified merged chunks. In this example as shown in FIG. 6B, the chunk size of merged chunk 602 is reduced from 4.1 KB to 3.6 KB, while merged chunk 603 grows from 1.5 KB to 2 KB. As a result, chunk sizes of all merged chunks satisfy the target average chunk size, where each merged chunk size of the merged chunks falls within a predetermined range (e.g., minimum and maximum) of the target average chunk size.

According to another embodiment, the processing logic considers all groupings of chunks into merged chunks, evaluates the resulting merged chunks based on their sizes, and selects the set of merged chunks with the best evaluated value. This evaluation may be performed efficiently using dynamic programming techniques to record previously evaluated merged results that are reused as the logic proceeds.

Figure 7:
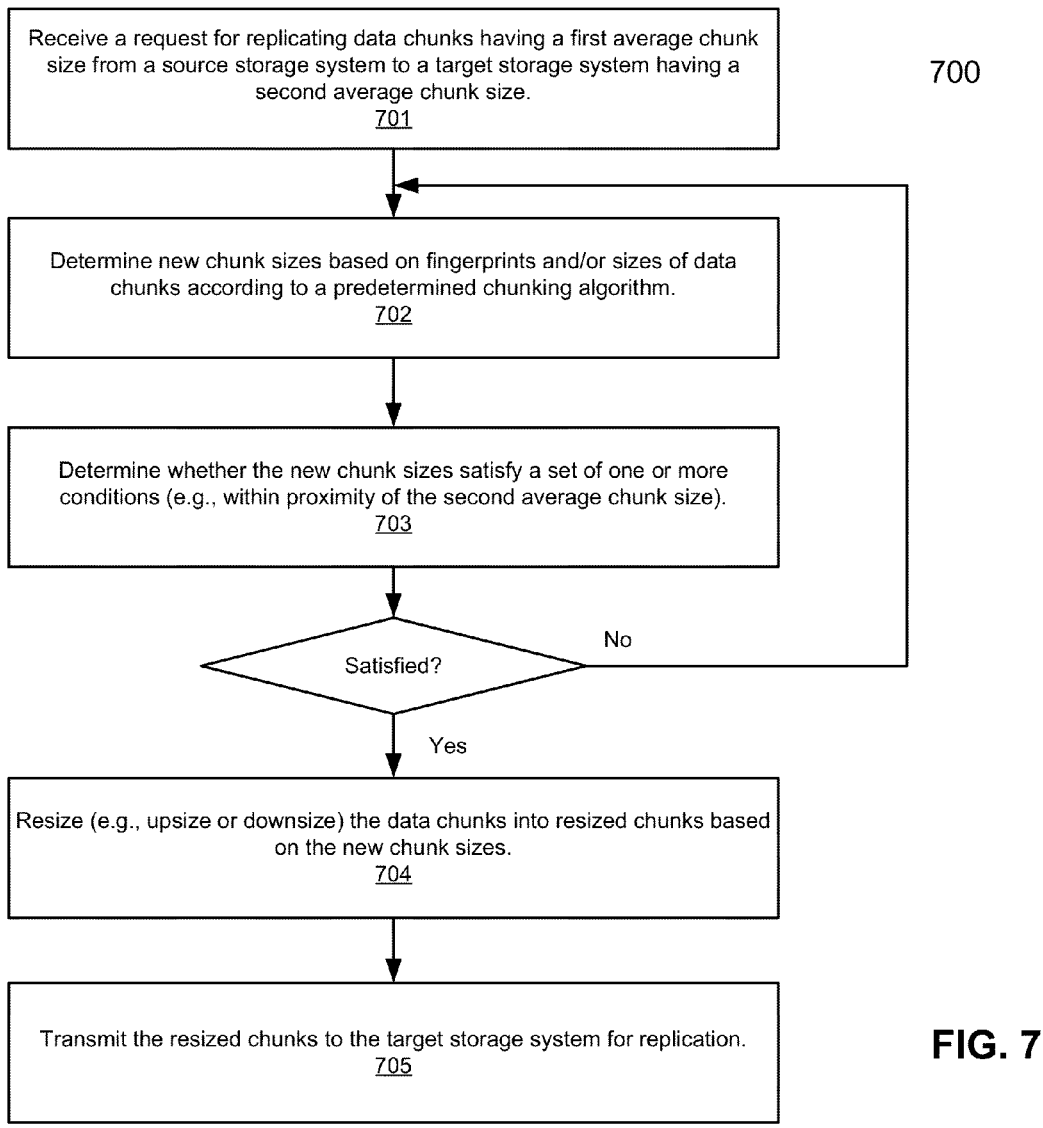
FIG. 7 is a flow diagram illustrating a method for replicating data chunks according to another embodiment of the invention.

FIG. 7 is a flow diagram illustrating a method for replicating chunk sizes of merged chunks according to another embodiment of the invention. Referring to FIG. 7, at block 701, a request is received for replicating or migrating data chunks of a source storage system having a first average chunk size to a target storage system having a second average chunk size. At block 702, new chunk sizes of potential resized chunks are determined based on fingerprint and/or sizes of the data chunks according to a predetermined algorithm. At block 703, it is determined whether all new chunk sizes satisfy the target average chunk size. If not, the operations of block 702 may be iteratively performed, for example, by adjusting sizes of some other resized chunks, until all resized chunk sizes satisfy the target average chunk size. At block 704, the resized chunks are formed by resizing the data chunks according to the new chunk sizes. At block 705, the resized chunks are then replicated or migrated to the target storage system.

With respect to resizing chunks to accommodate heterogeneous systems, according to certain embodiments, there are multiple scenarios. Data replicated from a host may deduplicate against future data from the same host. In addition, any storage systems that use the same process or algorithm to resize chunks should create the same resized chunks given the same data stream and will therefore deduplicate against each other. The approach using the fingerprint of each chunk to decide where to resize chunks into resized chunks is suitable for benefitting from deduplication across multiple replication periods from the same host or from deduplication across multiple hosts replicating onto a single system. However, such an approach may not be consistent with data that is natively chunked at a larger size unless the native chunking is actually using the same process (e.g., creating smaller chunks and then immediately merging them into bigger chunks using fingerprints).

To combine chunks into something that is often the same as the native chunking at a larger size, it is useful to store with the chunks the information (e.g., metadata) that was used to create the chunks in the first place. Using the fingerprints requires little or no extra storage and is well suited to an environment in which fingerprints of chunks or sub-chunks are analyzed to select the best chunk size. Using the original anchors requires the system to store the anchors with the data chunks, which increases metadata overhead but may also enable an alternative approach.

Consider a system that chunks data by passing over a minimum amount of data, computing a hash over a sliding window, and breaking the data into a chunk at the point with the highest hash value prior to a maximum chunk size. If its target chunk size is 16 KB, with 8 KB and 24 KB minimum and maximum sizes respectively, then it will be broken at the highest hash value within that 16 KB range. Another system that breaks the same data into 8 KB chunks will also likely set a chunk boundary at that point, because the high fingerprint value that was the greatest within a 16 KB region will likely also be the highest fingerprint value within some 4 KB-12 KB ranges. In some cases, however, there will be a higher fingerprint value that was ignored in the 16 KB case because it falls within 8 KB of the previous chunk boundary, i.e. below the minimum chunk size. When the smaller chunks are merged together and the chunk with the highest hash is searched, a new chunk is formed ending before that high fingerprint value.

According to some embodiments, when replicating from a source storage system with a smaller average chunk size to a target storage system with a larger average chunk size, there are various options. In one embodiment, one can take the original files, read them in, chunk them at the larger size, and send the fingerprints of the new chunks to a target storage system (including data for any chunks not already on the target system). In another embodiment, one can take the chunks and merge them, then compute fingerprints of the resized chunks by reading the original chunks. This would result in fingerprints that reflect the actual content, but it would also require reading the entire logical stream.

Another embodiment is to maintain an index of <chunk, chunk, chunk> to a resized chunk mappings. In this embodiment, the first time a resized chunk is formed, processing logic is to read the chunks to compute the fingerprint over the resized chunk's content. The processing logic is then to insert that fingerprint into another index that can be consulted, such that future resized chunks comprised of the same chunks could be identified by fingerprint without reading the raw data and running a hash such as SHA-1 over the chunks.

According to another embodiment, one can also merge the data chunks, and then use a hash of the chunk fingerprints to compute the fingerprint of the mchunk. That is, the fingerprint of a resized chunk is generated based on fingerprints of the data chunks that made up the resized chunk, rather than based on the actual content of the data chunks. This has the advantage of not requiring the original chunks to be read. Future resized chunks comprised of the same chunks would deduplicate against this fingerprint, whether they are generated on this host or another host that is merging the same way (including the target system, conceivably).

According to a further embodiment, for a source storage system that is initially configured to replicate to a target storage system with a larger average chunk size, input data are chunked at both its native size and also merged into the size of the target storage system. It would keep at least two lists of <fingerprint, length> tuples per file, one at the native size as shown in data structure 801 and one at the target size in data structure 802 as shown in FIG. 8A.

In this example, referring to FIG. 8A, the chunks with content A-D are merged as the file is added to the system, creating an mchunk with the contents of A-D concatenated together though the mchunk is not stored at this time. When replicating to a system requiring a 32K average size, the system would use the "recipe" for a file that contains the 32K mchunks, and transmit the fingerprints for the larger mchunks. If an mchunk is not stored on the target, the source needs the comprising 8K chunks to find the data. It uses the current cumulative offset in the 32K recipe 802 and the 8K recipe 801 to map the offset to chunks A-D or BEFG. One benefit of this approach is that it avoids the requirement that chunks be reread to compute a fingerprint of the merged chunks, while still keeping the fingerprint tied to the actual content.

The SHA-1 hash for the mchunk can be computed as data is processed and some processing can be reused. When SHA (A) is computed, it will be stored as the fingerprint for chunk A, but it is also the first part of SHA (ABCD), as shown in FIG. 8B. Each time a new mchunk is created, the SHA-1 value for it can start with the SHA-1 state of its first chunk. However, since the breakpoint for the mchunk may not be known until the SHA-1 fingerprints of several chunks have been computed, more generally the contents of those chunks need to be cached so a new multi-chunk SHA-1 hash can be computed after the boundary is known. Alternatively, as new chunks are processed and the breakpoint is being decided, a cumulative SHA-1 value for each possible mchunk breakpoint could be computed. Here, processing logic can start with A; then add B and compute the current cumulative SHA of AB; then add C, D, B again, and finally E. Then the best breakpoint is selected, which turns out to be ABCD. As a result, SHA (ABCD) is used and the processing logic starts the next mchunk with SHA (B). However, since it has already moved ahead and computed SHA (E), it needs to back up and add E back into just B.

In all it might be best to save the SHA state of each chunk that could be the start of an mchunk, for the brief period while the breakpoints are decided, but not worry about computing each SHA value (as it might not be needed). Instead, it can just cache chunks until the mchunk SHA is computed. In the event that the ratio of mchunks to chunks is high, such as 0.5, and it is likely that most mchunks consist of just a couple of chunks, picking up the SHA state for the second chunk may help. Note that the SHA-1 hash is utilized as an example of a hash algorithm; other hash functions such as MD5 may also be utilized.

Figure 9:
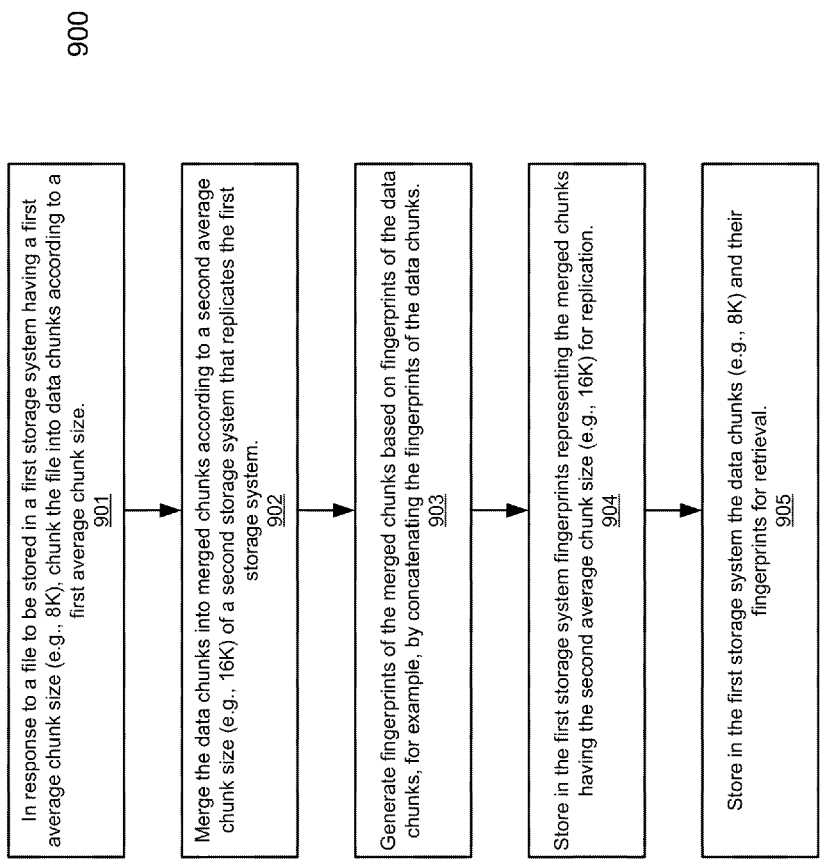
FIG. 9 is a flow diagram illustrating a method for maintaining data chunks for efficient replication according to one embodiment of the invention.

FIG. 9 is a flow diagram illustrating a method for maintaining data chunks for efficient replication according to one embodiment of the invention. Referring to FIG. 9, at block 901, in response to a file to be stored in a first storage system having a first average chunk size (e.g., source storage system), the file is partitioned or chunked into data chunks according to the first average chunk size. At block 902, the data chunks are merged into merged chunks according to a second average chunk size of a second storage system that replicates the first storage system. At block 903, fingerprints of the merged chunks are generated based on fingerprints of the data chunks, for example, by concatenating the fingerprints of the data chunks that make up the merged chunks. At block 904, a first data structure is maintained to store metadata such as fingerprints of the merged data chunks that have been chunked according to the second average chunk size. The first data structure is utilized to replicate the corresponding merged data chunks to the second storage system. At block 905, a second data structure is maintained to store metadata such as fingerprints of the data chunks that make up the merged chunks for retrieval.

For the purpose of illustration, it is assumed that a source storage system has an average chunk size of 8 KB while a target storage system has an average chunk size of 16 KB (e.g., replication from one storage system having a smaller average chunk size to another storage system having a larger average chunk size). In general, according to one embodiment, when a file is stored in the source storage system, the file is partitioned or chunked into 8 KB chunks and fingerprints of the 8 KB chunks are generated. The 8 KB chunks and their fingerprints are then stored in the source storage system. During replication, the 8 KB chunks are merged into 16 KB chunks using the techniques described above.

In another scenario, according to another embodiment, when a file is stored in the source storage system, the file is partitioned into 8 KB chunks and the associated fingerprints are generated. The 8 KB chunks and the associated fingerprints are then stored in the source storage system. In addition, the 8 KB chunks are merged into 16 KB chunks and fingerprints for the merged 16 KB chunks are generated. The fingerprints for the merged 16 KB chunks are then stored in the source storage system. Note that in this embodiment, the merged 16 KB chunks are not stored; only their fingerprints are stored in the source storage system. During the replication, the fingerprints representing the 16 KB chunks are transmitted to the target storage system. The target storage system examines the fingerprints to determine which of the represented 16 KB chunks have not been stored in the target storage system. The target storage system then indicates to the source storage system which fingerprints are missing on the target storage system. For example, the target storage system may return a bitmask with certain bits having a predetermined logical value (e.g., logical TRUE or FALSE) for indicating the missing fingerprints. The source storage system then generates the missing 16 KB chunks based on the 16 KB fingerprints and transmits the missing 16 KB chunks to the target storage system for replication. In this scenario, the 8K fingerprints are utilized for data retrieval and deduplication purposes, while the 16 KB fingerprints are utilized for replication purpose.

In a further scenario, according to a further embodiment, when a file is stored in the source storage system, the file is partitioned into 16 KB chunks and the associated 16 KB fingerprints are generated. The 16 KB chunks are then further partitioned (also referred to as sub-chunked) into 8 KB chunks and the associated 8 KB fingerprints are generated. The 8 KB chunks, 8 KB fingerprints, and 16 KB fingerprints are then stored in the source storage system. In this example, the 16 KB chunks are not stored in the source storage system. During the replication, the 16 KB fingerprints are transmitted to the target storage system. The target storage system indicates to the source storage system which fingerprints are missing on the target storage system. The source storage system then generates the missing 16 KB chunks by merging the associated 8 KB chunks. In this scenario, the 8K fingerprints are utilized for data retrieval and deduplication purposes, while the 16 KB fingerprints are utilized for the purpose of replication.

In a further embodiment, files may be chunked into 8 KB chunks and the 8 KB chunks, as well as their fingerprints, are then stored in the source storage system. During replication, the 8 KB chunks and the fingerprints are transmitted to the target storage system. The target storage system then merges the 8 KB chunks into 16 KB chunks and generates the corresponding 16 KB fingerprints. The 16 KB chunks and their fingerprints are then stored in the target storage system. In this example, the target storage system may not need to store the 8 KB fingerprints.

Alternatively, according to another embodiment, files may be chunked into 8 KB chunks and the 8 KB chunks, as well as their fingerprints, are then stored in the source storage system. During the replication, the source storage system transmits the 8 KB fingerprints to the target storage system. The target storage system returns at least some of 8 KB fingerprints representing some 8 KB chunks that have not been stored in the target storage system. In response, the source storage system then transmits the missing 8 KB chunks to the target storage system. The target storage system then merges the 8 KB chunks into 16 KB chunks and generates the corresponding 16 KB fingerprints. In this example, the target storage system may store both the 8 KB and 16 KB fingerprints. The 8 KB fingerprints may be used to deduplicate subsequent 8 KB chunks received from a source storage system (e.g., same or different source system). The 16 KB fingerprints may be used for retrieval of 16 KB chunks or deduplication against other 16 KB chunks.

The above described techniques can also be applied in other scenarios such as replication from a source storage system having a larger average chunk size to a target storage system having a smaller average chunk size. For the purpose of illustration, it is assumed that a source storage system has an average chunk size of 16 KB while a target storage system has an average chunk size of 8 KB. In one scenario, according to one embodiment, a source storage system chunks files into 16 KB chunks and store the 16 KB chunks and their respective 16K fingerprints in the source storage system. A target storage system chunks files received from clients into 16 KB chunks and generates the corresponding 16 KB fingerprints. The 16 KB chunks are then subchunked into 8 KB chunks and the corresponding 8 KB fingerprints are generated. The 8 KB chunks, 8 KB fingerprints, and 16 KB fingerprints are then stored in the target storage system. During replication, the source storage system transmits 16 KB fingerprints representing the 16 KB chunks for replication to the target storage system. The target storage system compares the received 16 KB fingerprints against the 16 KB fingerprints stored locally for deduplication. The target storage system returns to the source storage system 16 KB fingerprints representing 16 KB chunks that are missing at the target storage system. The source storage system then transmits the missing 16 KB chunks to the target storage system. In response to the 16 KB chunks received from the source storage system, the target storage system then subchunks the 16 KB chunks into 8 KB chunks and generates the corresponding 8 KB fingerprints. The 8 KB chunks and their respective 8 KB fingerprints are then stored in the target storage system.

Alternatively, according to another embodiment, the source storage system chunks files into 16 KB chunks and generates the corresponding 16 KB fingerprints. The 16 KB chunks are then subchunked into 8 KB chunks and the corresponding 8 KB fingerprints are generated. The 16 KB chunks, 16 KB fingerprints, and 8 KB fingerprints are then stored in the source storage system. During the replication, the 8 KB fingerprints representing 16 KB chunks for replication are transmitted to the target storage system. The target storage system uses the received 8 KB fingerprints against the 8 KB fingerprints maintained locally for deduplication. The target storage system then returns to the source storage system an indication indicating which fingerprints are missing on the target storage system. The source storage system then extracts and transmits the corresponding 8 KB chunks to the target storage system based on the indication received from the target storage system. Alternatively, the source storage system may transmit the 16 KB chunks to the target storage system. The target storage system then subchunks the 16 KB chunks into 8 KB chunks and stores the 8 KB chunks in the target storage system.

Figure 10:
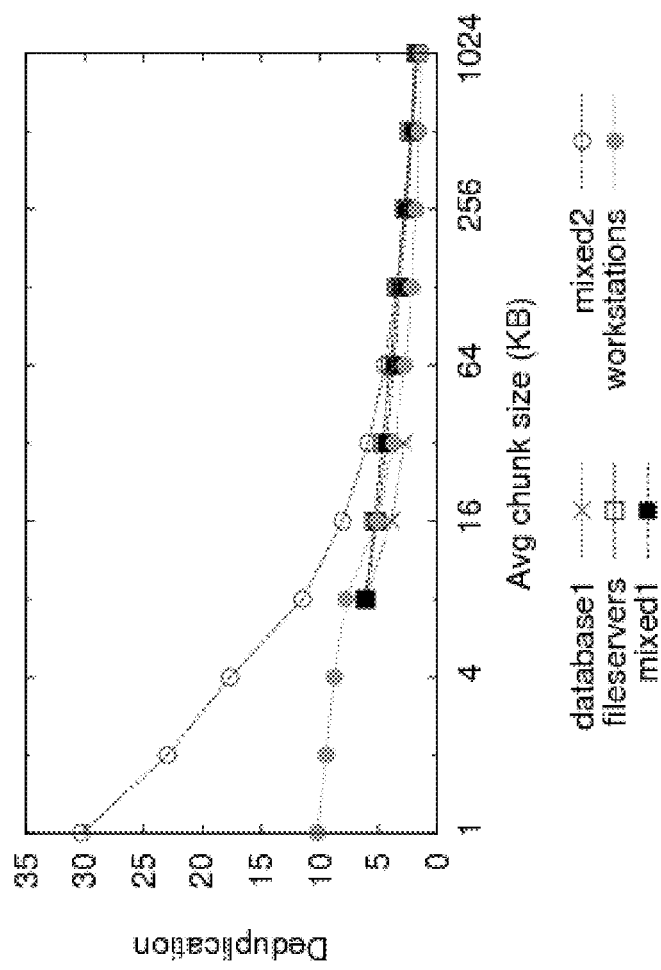
FIG. 10 is a diagram illustrating statistics of deduplication effectiveness in view of chunk sizes.

According to some embodiments, the techniques described above can also be utilized to estimate deduplication as a function of a chunk size. As shown in FIG. 10, the deduplication achieved for several datasets as a function of an average chunk size. One ("mixed2") shows a steep improvement from particularly small chunks, while another ("workstations") shows a much more limited change. With all the datasets, at larger chunk sizes the deduplication drops moderately. While it has been reported that as a rule of thumb deduplication increases by 15% with each drop of a power of two in chunk size, and the meta-data overhead increases by 50% with each drop, variability across datasets suggests that dataset-specific knowledge of the effect of changing the chunk size can be important in optimizing the chunk size selection.

Figure 11:
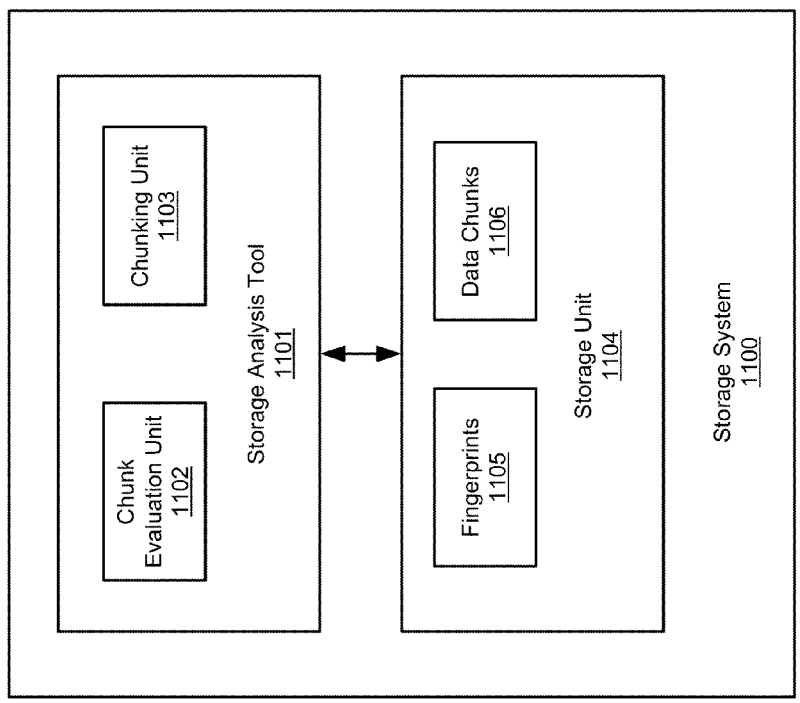
FIG. 11 is a block diagram illustrating a system to estimate performance of a deduplicated storage system based on average chunk sizes according to one embodiment of the invention.

FIG. 11 is a block diagram illustrating a system to estimate performance of a deduplicated storage system based on average chunk sizes according to one embodiment of the invention. Referring to FIG. 11, storage system 1100 may represent any of the storage systems described above, such as system 104 of FIG. 1. According to one embodiment, the techniques described above are implemented as part of storage analysis tool 1101 running within storage system 1100, where analysis tool 1101 is configured to perform an analysis on data fingerprints 1105 of data chunks 1106 stored in storage unit 1104 to determine the deduplication characteristics. Note that analysis tool 1101 may be maintained and executed locally within storage system 1100. Alternatively, analysis tool 1101 may be maintained by a remote device or server and provide analysis services to storage system 1100 over a network (e.g., cloud services).

In one embodiment, analysis tool 1101 includes chunk evaluation unit 1102 and chunking unit 1103. Chunk evaluation unit 1102 is configured to evaluate a deduplication rate of data chunks 1106 based on fingerprints 1105. In one embodiment, chunk evaluation unit 1102 is configured to examine metadata (e.g., fingerprints) of first data chunks that has been partitioned according to a first chunk size (e.g., 1 KB chunks) and to derive a second chunk size (e.g., 2 KB, 4 KB, 8 KB, 16 KB, etc.) representing second data chunks that would have potentially merged from the first data chunks, for example, using at least some of the techniques described above. In one embodiment, the first data chunks may be generated by partitioning the data chunks originally stored in the stored in the storage system. Second metadata of the potential second data chunks is generated based on first metadata of the first data chunks, for example, without using the actual first data chunks. The duplication rate of the potential second data chunks may be determined based on the second metadata.

Figure 12:
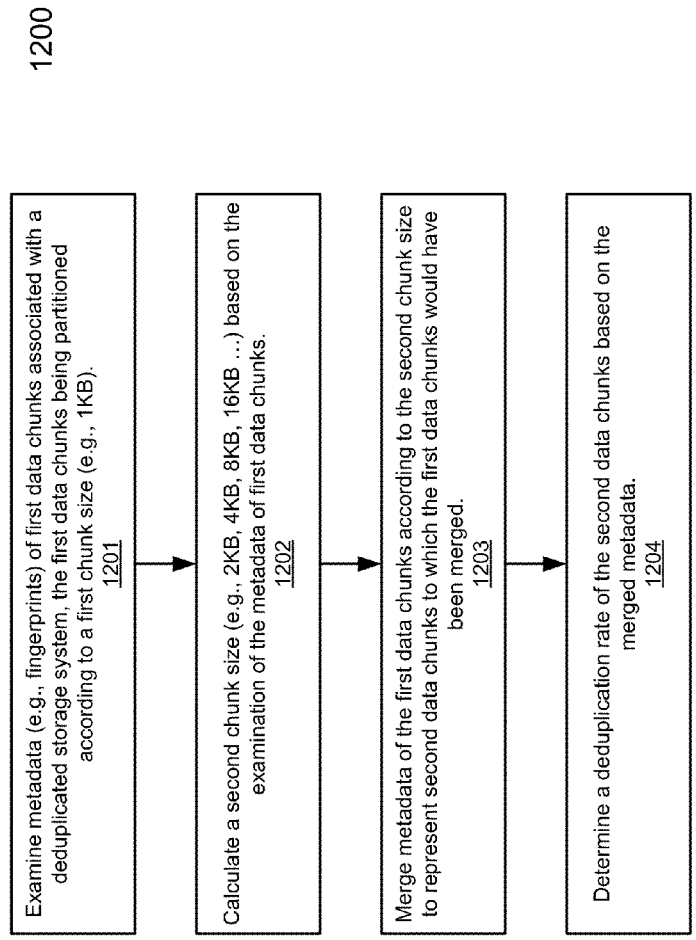
FIG. 12 is a flow diagram illustrating a method for determining a chunk size from another chunk size according to one embodiment of the invention.

FIG. 12 is a flow diagram illustrating a method for determining a chunk size from another chunk size of data chunks according to one embodiment of the invention. Method 1200 may be performed by chunk evaluation unit 1102 of FIG. 11. Referring to FIG. 12, at block 1201, first metadata (e.g., fingerprints) of first data chunks is examined, where the first data chunks have been partitioned according to a first chunk size (e.g., 1 KB). At block 1202, a second chunk size (e.g., 2 KB, 4 KB, 8 KB, 16 KB . . . etc.) is calculated based on the examination of the first metadata. At block 1203, first metadata of the first data chunks is merged to generate second metadata representing second data chunks to which the first data chunks would have been merged. At block 1204, a deduplication rate of the second data chunks is determined based on the second metadata.

In addition, according to another embodiment, chunk evaluation unit 1102 is to determine an average chunk size for data represented by data chunks 1106 that has the highest deduplication rate with a relatively low maintenance cost. In one embodiment, chunk evaluation unit 1102 is configured to evaluate fingerprints 1105 for various average chunk size candidates in a pool and to compute the deduplication rate for data chunks that would have been chunked according to each of the chunk size candidates.

According to one embodiment, for each of the chunk size candidates, fingerprints 1105 may be partitioned or merged using the techniques described above, generating merged fingerprints. The merged fingerprints are then utilized to estimate the deduplication rate of the corresponding merged chunks. Such an estimate of a deduplication rate may be performed solely based on fingerprints 1105 without accessing actual content of data chunks 1106. In addition, the potential maintenance cost for the merged chunks for each chunk size candidate is also estimated. Thereafter, a chunk size candidate is selected from the pool as a final chunk size candidate that has better duplication rate with a relatively low maintenance cost. Optionally, data chunks 1106 can be rechunked (e.g., partitioned and/or merged) by chunking unit 1103 according to the selected chunk size candidate. Thus, such a technique can be utilized to improve performance of a deduplication storage system. When the average chunk size decreases in half, the size of a file recipe doubles to include references to all of the smaller chunks, so the meta-data required to reconstruct a file takes up more storage space. Since the deduplication ratio of the data tends to increase at smaller chunk sizes as well, the fraction of stored bytes devoted to file meta-data grows.

Figure 13:
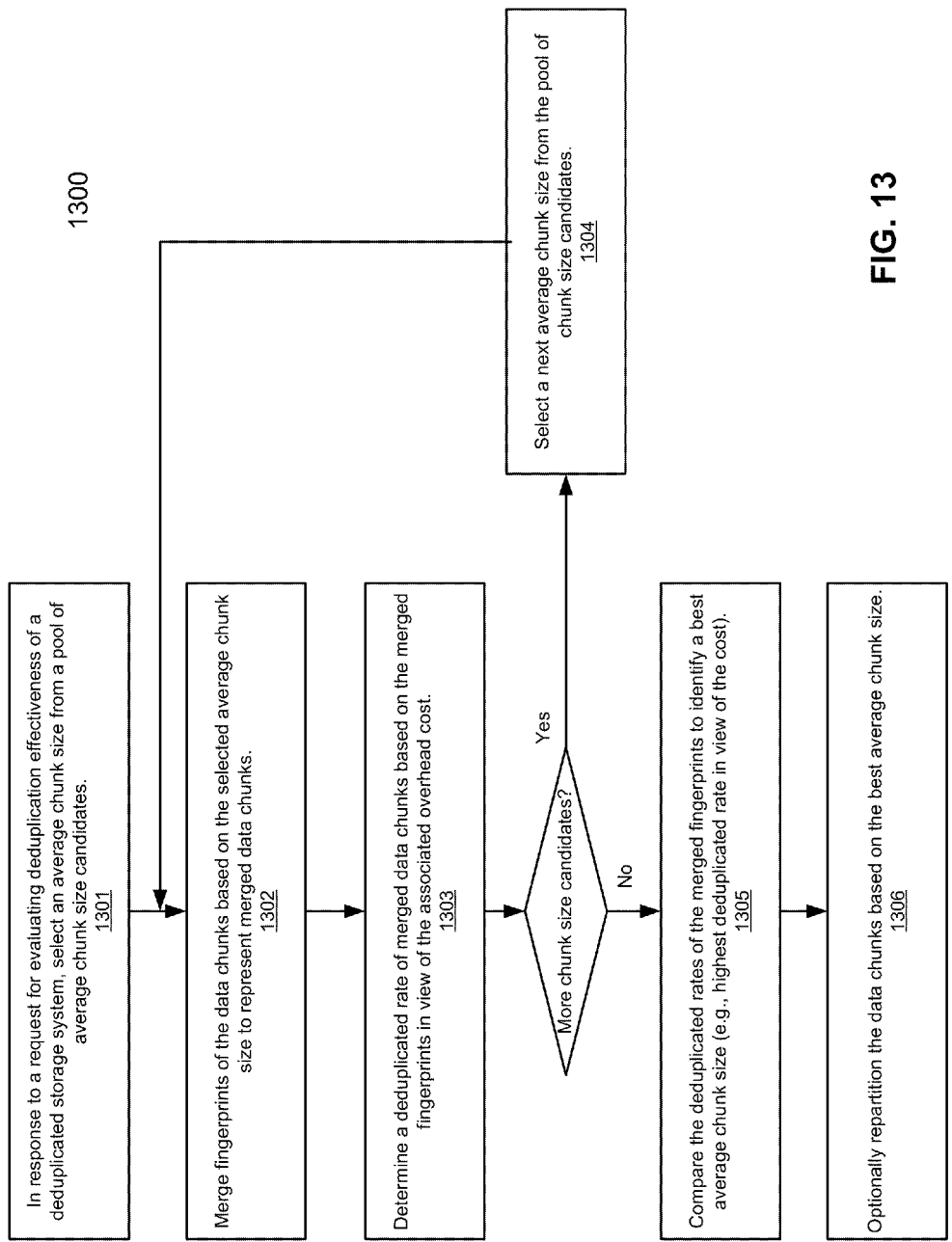
FIG. 13 is a flow diagram illustrating a method for evaluating performance of a deduplicated storage system according to one embodiment of the invention.

FIG. 13 is a flow diagram illustrating a method for evaluating performance of a deduplicated storage system according to one embodiment of the invention. Method 1300 may be performed by analysis tool 1101 of FIG. 11. Referring to FIG. 13, at block 1301, in response to a request for evaluating deduplication effectiveness of a deduplicated storage system, an average chunk size is selected from a pool of average chunk size candidates. At block 1302, fingerprints of data chunks stored in the storage system is merged or partitioned based on the selected average chunk size. The merged fingerprints represent merged chunks that would have been merged or partitioned based on the selected average chunk size. At block 1303, a deduplication rate for the would-be merged chunks and the overhead cost are determined. If there are more chunk size candidates remained in the pool, at block 1304, a next chunk size candidate is selected and the above operations involved in blocks 1302 and 1303 are iteratively performed until all chunk size candidates have been processed. At block 1305, the duplication rates associated with all chunk size candidates are compared in view of their respective overhead cost to identify the best average chunk size for the storage system (e.g., highest deduplication rate with a relatively low cost). At block 1306, optionally the data chunks may be rechunked according to the identified average chunk size.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   receiving a request to evaluate deduplication effectiveness of a deduplicated storage system;
   examining, in response to the request, metadata of first data chunks associated with the deduplicated storage system, the first data chunks being partitioned from one or more data files according to a first chunk size;
   calculating a plurality of new chunk sizes based on the examination of the metadata of first data chunks;
   merging metadata of the first data chunks according to each of the plurality of new chunk sizes to represent new data chunks to which the first data chunks would have been merged;
   determining a deduplication rate of each of the new data chunks based on the merged metadata; and selecting a second chunk size from the plurality of new chunk sizes, wherein the second chunk size has the highest deduplication rate among all the plurality of new chunk sizes.

2. The method of claim 1, further comprising:

determining whether the deduplication rate satisfies a predetermined condition;

merging the first data chunks into the second data chunks according to the second chunk size if the deduplication rate satisfies the predetermined condition; and storing the second data chunks in the deduplicated storage system replacing the first data chunks.

3. The method of claim 1, further comprising:

determining whether the second data chunk size improves storage system properties including write throughput by a predetermined amount;

merging the first data chunks into the second data chunks according to the second chunk size if the second data chunk size improves the storage system properties; and storing the second data chunks in the deduplicated storage system replacing the first data chunks.

4. The method of claim 1, wherein the second chunk size is one of a plurality of chunk size candidates, wherein for each of the plurality of chunk size candidates, merging metadata and determining deduplication rate are iteratively performed.

5. The method of claim 4, further comprising selecting a final chunk size candidate based on the deduplication rates associated with the plurality of chunk size candidates.

6. The method of claim 5, wherein the final chunk size candidate is selected further based on a cost to maintain metadata associated with the final chunk size candidate and corresponding data chunks to be formed based on the final chunk size candidate.

7. The method of claim 4, further comprising, prior to examining metadata of the first data chunks, generating the first data chunks by partitioning original data chunks stored in the deduplicated storage system according to an initial chunk size, wherein the initial chunk size is smaller than or equal to the smallest chunk size candidate amongst the chunk size candidates.

8. The method of claim 4, wherein the second chunk size is within a predetermined proximity of a selected chunk size selected from the plurality of chunk size candidates during a corresponding iteration.

9. The method of claim 1, wherein boundaries of the second data chunks is determined based on values of metadata or features of the first data chunks to be merged therein.

10. A non-transitory computer-readable storage medium having instructions stored therein, which when executed by a computer, cause the computer to perform operations comprising:

receiving a request to evaluate deduplication effectiveness of a deduplicated storage system;

examining, in response to the request, metadata of first data chunks associated with the deduplicated storage system, the first data chunks being partitioned from one or more data files according to a first chunk size;

calculating a plurality of new chunk sizes based on the examination of the metadata of first data chunks;

merging metadata of the first data chunks according to each of the plurality of new chunk sizes to represent new data chunks to which the first data chunks would have been merged;

determining a deduplication rate of each of the new data chunks based on the merged metadata; and selecting a second chunk size from the plurality of new chunk sizes, wherein the second chunk size has the highest deduplication rate among all the plurality of new chunk sizes.

11. The computer-readable storage medium of claim 10, wherein the operations further comprise:

determining whether the deduplication rate satisfies a predetermined condition;

merging the first data chunks into the second data chunks according to the second chunk size if the deduplication rate satisfies the predetermined condition; and storing the second data chunks in the deduplicated storage system replacing the first data chunks.

12. The computer-readable storage medium of claim 10, wherein the operations further comprise:

determining whether the second data chunk size improves storage system properties including write throughput by a predetermined amount;

merging the first data chunks into the second data chunks according to the second chunk size if the second data chunk size improves the storage system properties; and storing the second data chunks in the deduplicated storage system replacing the first data chunks.

13. The computer-readable storage medium of claim 10, wherein the second chunk size is one of a plurality of chunk size candidates, wherein for each of the plurality of chunk size candidates, merging metadata and determining deduplication rate are iteratively performed.

14. The computer-readable storage medium of claim 13, wherein the operations further comprise selecting a final chunk size candidate based on the deduplication rates associated with the plurality of chunk size candidates.

15. The computer-readable storage medium of claim 14, wherein the final chunk size candidate is selected further based on a cost to maintain metadata associated with the final chunk size candidate and corresponding data chunks to be formed based on the final chunk size candidate.

16. The computer-readable storage medium of claim 13, wherein the operations further comprise, prior to examining metadata of the first data chunks, generating the first data chunks by partitioning original data chunks stored in the deduplicated storage system according to an initial chunk size, wherein the initial chunk size is smaller than or equal to the smallest chunk size candidate amongst the chunk size candidates.

17. The computer-readable storage medium of claim 13, wherein the second chunk size is within a predetermined proximity of a selected chunk size selected from the plurality of chunk size candidates during a corresponding iteration.

18. The computer-readable storage medium of claim 10, wherein boundaries of the second data chunks is determined based on values of metadata or features of the first data chunks to be merged therein.

19. A storage system, comprising:

a storage unit to store a plurality of deduplicated data chunks; and a chunk evaluation unit coupled to the storage unit configured to receive a request to evaluate deduplication effectiveness of a deduplicated storage system, examine metadata of first data chunks partitioned from one or more data files according to a first chunk size, calculate a plurality of new chunk sizes based on the examination of the metadata of first data chunks, merge metadata of the first data chunks according to each of the plurality of new chunk sizes to represent new data chunks to which the first data chunks would have been merged, determine a deduplication rate of each of the new data chunks based on the merged metadata, select a second chunk size from the plurality of new chunk sizes, wherein the second chunk size has the highest deduplication rate among all the plurality of new chunk sizes.

20. The system of claim 19, further comprising a chunking unit configured to:

determine whether the deduplication rate satisfies a predetermined condition;

merge the first data chunks into the second data chunks according to the second chunk size if the deduplication rate satisfies the predetermined condition; and store the second data chunks in the deduplicated storage system replacing the first data chunks.

21. The system of claim 19, further comprising a chunking unit configured to:

determine whether the second data chunk size improves storage system properties including write throughput by a predetermined amount;

merge the first data chunks into the second data chunks according to the second chunk size if the second data chunk size improves the storage system properties; and store the second data chunks in the deduplicated storage system replacing the first data chunks.

22. The system of claim 19, wherein the second chunk size is one of a plurality of chunk size candidates, wherein for each of the plurality of chunk size candidates, merging metadata and determining deduplication rate are iteratively performed.

23. The system of claim 22, wherein a final chunk size candidate is selected based on the deduplication rates associated with the plurality of chunk size candidates.

24. The system of claim 23, wherein the final chunk size candidate is selected further based on a cost to maintain metadata associated with the final chunk size candidate and corresponding data chunks to be formed based on the final chunk size candidate.

* * * * *